Oct. 5, 1965  C. VAN DER LELY ETAL  3,209,841
EARTH WORKING TOOL HAVING A TORSION SPRING SUPPORT
Filed Sept. 6, 1961  10 Sheets-Sheet 1
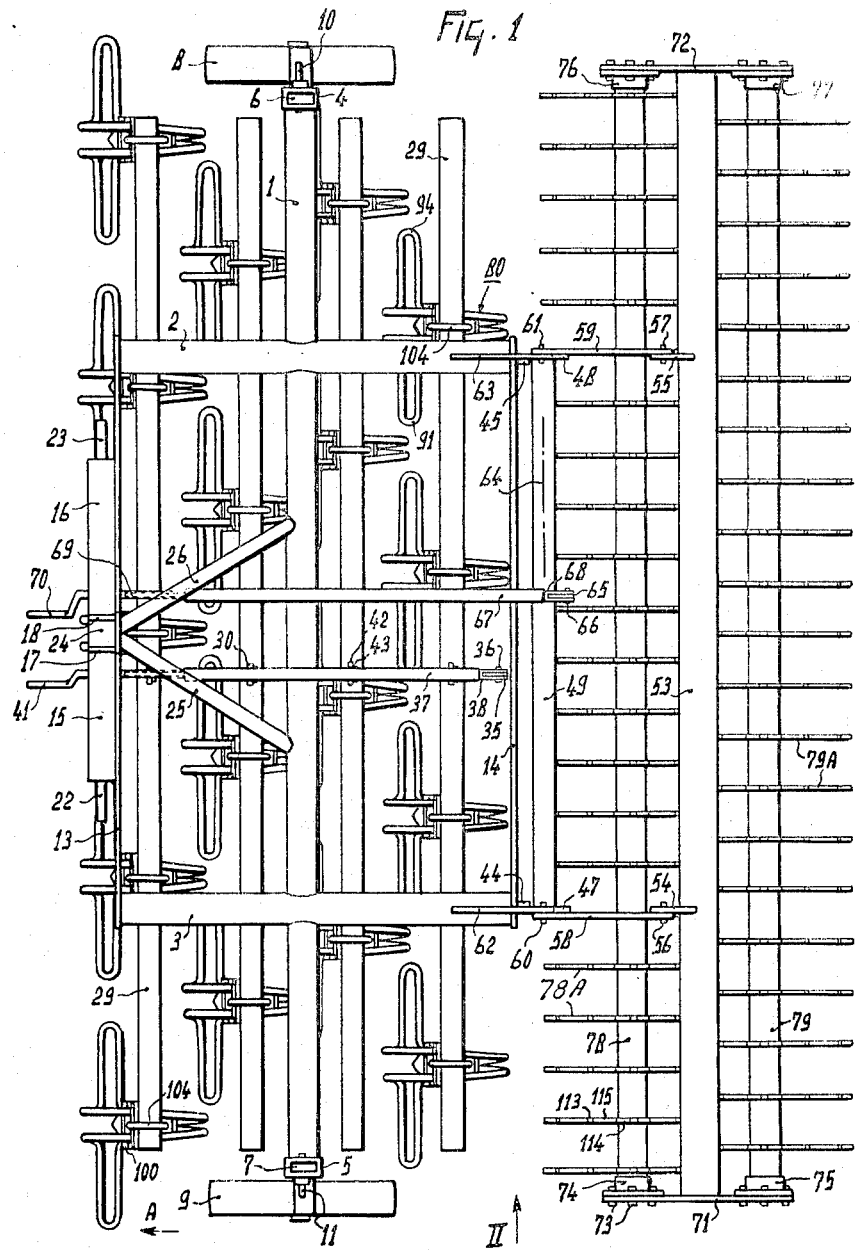
INVENTORS
CORNELIS & ARY VAN DER LELY
BY
Mason, Mason & Albright
ATTORNEYS Oct. 5, 1965  C. VAN DER LELY ETAL  3,209,841
EARTH WORKING TOOL HAVING A TORSION SPRING SUPPORT
Filed Sept. 6, 1961  10 Sheets-Sheet 2
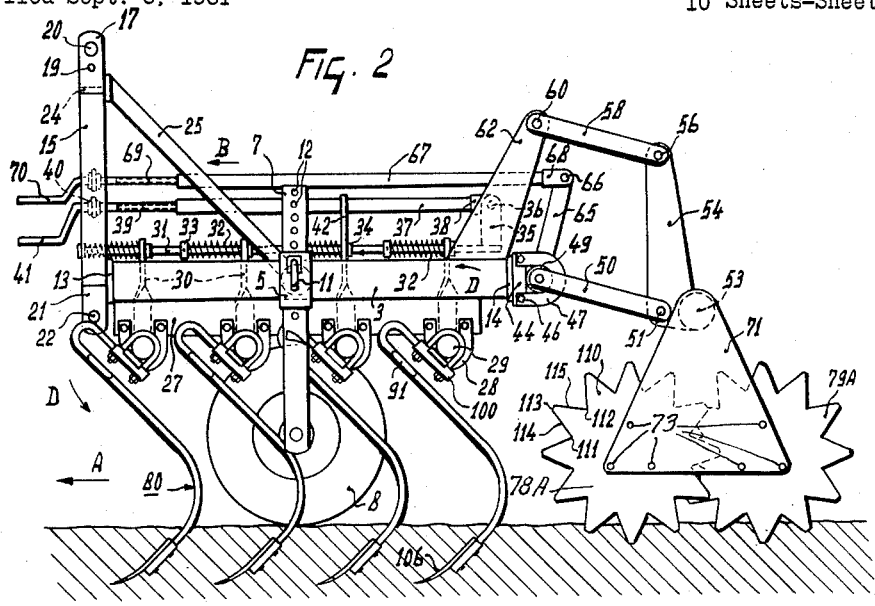
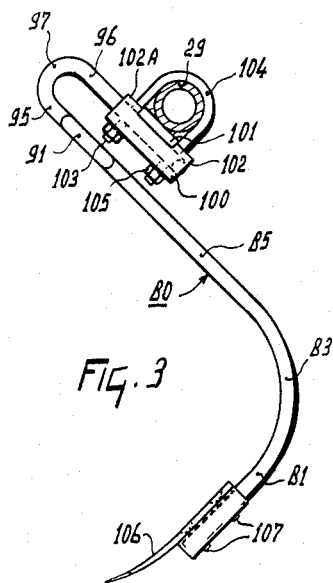
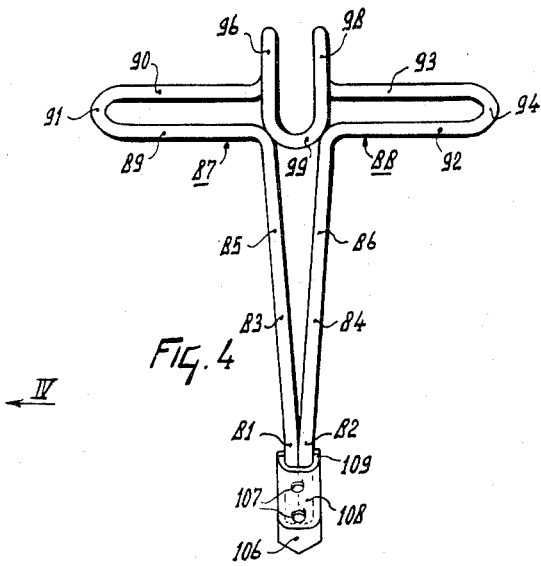
INVENTORS,
CORNELIS & ARY VAN DER LELY
BY
Mason, Mason & Albright
ATTORNEYS

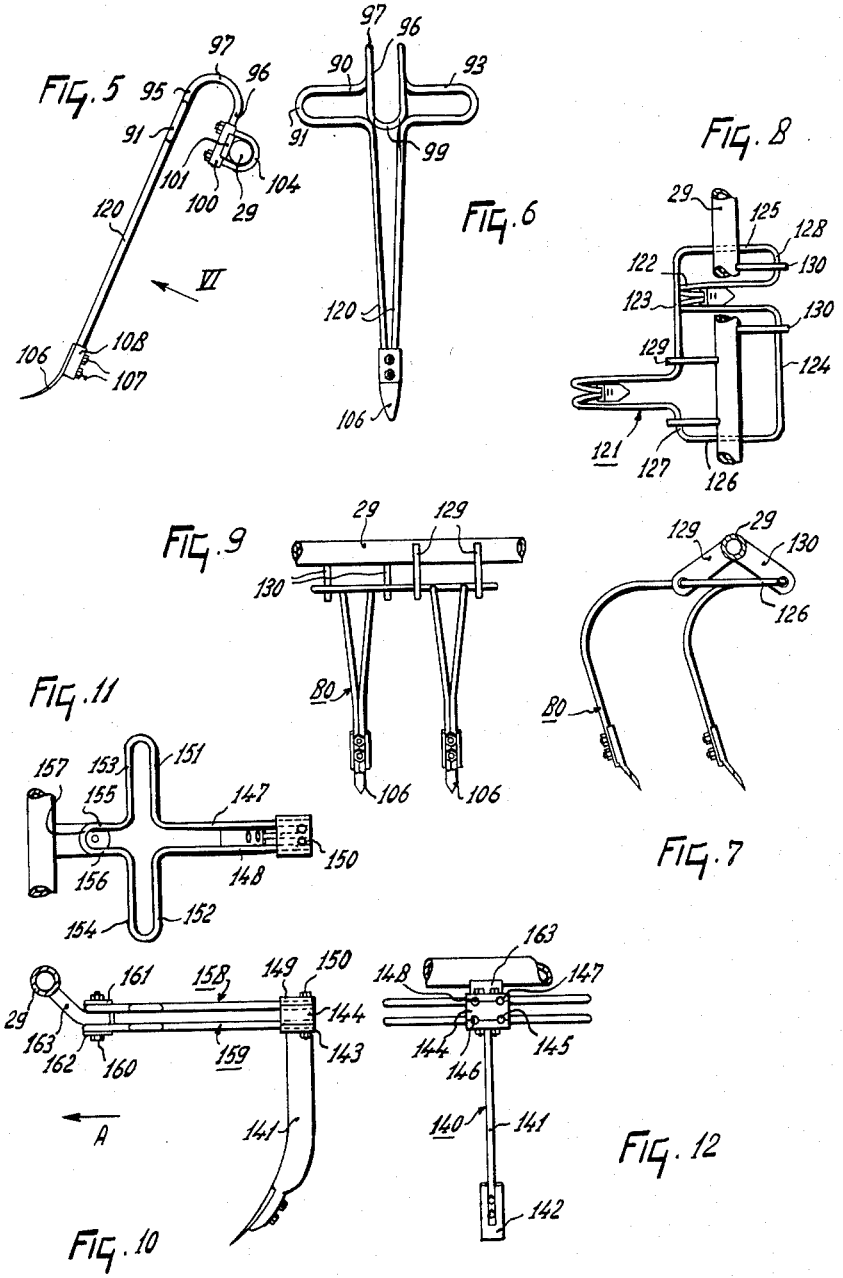

Oct. 5, 1965  C. VAN DER LELY ETAL  3,209,841
EARTH WORKING TOOL HAVING A TORSION SPRING SUPPORT
Filed Sept. 6, 1961  10 Sheets-Sheet 5
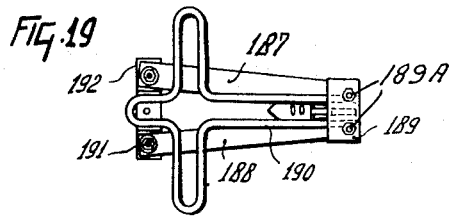
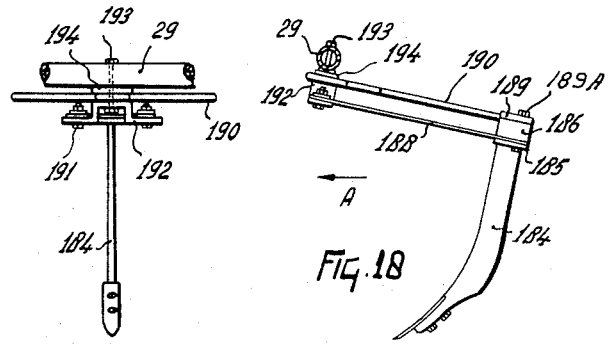
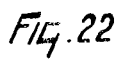
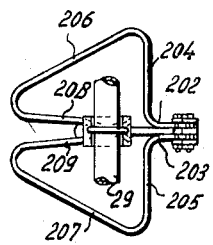
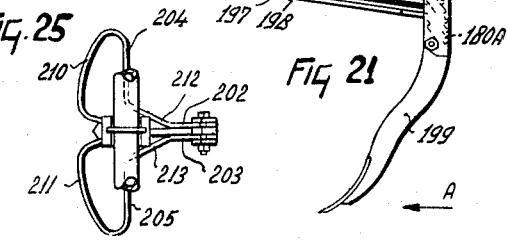
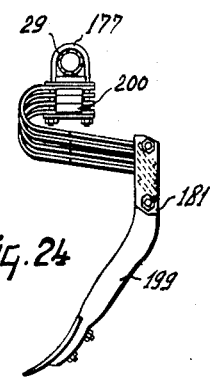
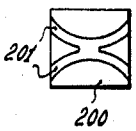
INVENTORS
CORNELIS & ARY VAN DER LELY
BY
Mason, Mason & Albright Oct. 5, 1965  C. VAN DER LELY ETAL  3,209,841
EARTH WORKING TOOL HAVING A TORSION SPRING SUPPORT
Filed Sept. 6, 1961  10 Sheets-Sheet 6

INVENTORS
CORNELIS & ARY VAN DER LELY
BY
Mason, Mason & Albright
ATTORNEYS

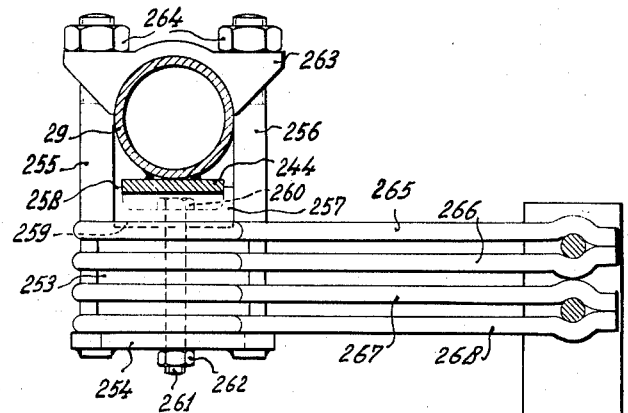
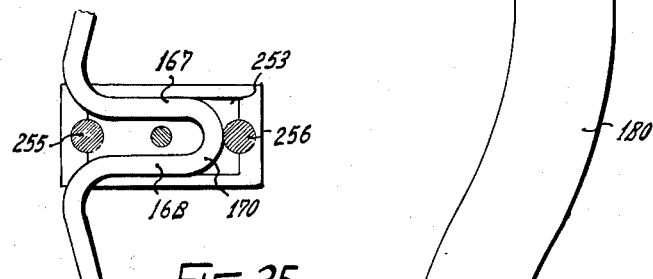
Fig. 35
Fig. 34

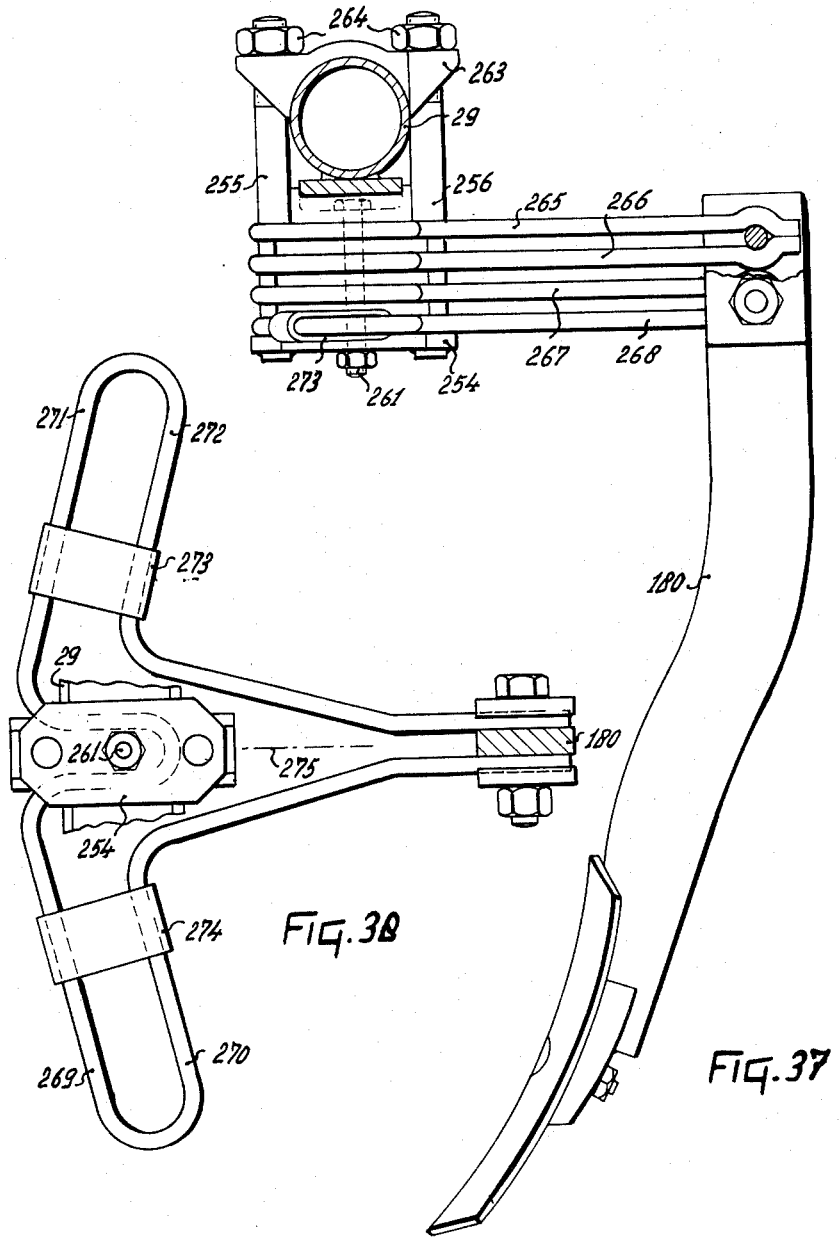

United States Patent Office 3,209,841
Patented Oct. 5, 1965

3,209,841
EARTH WORKING TOOL HAVING A TORSION SPRING SUPPORT
Cornelis van der Lely, Zug, Switzerland, and Ary van der Lely, Maasland, Netherlands, assignors to C. van der Lely N.V., Maasland, Netherlands, a Dutch limited-liability company
Filed Sept. 6, 1961, Ser. No. 136,269
Claims priority, application Netherlands, Sept. 7, 1960, 255,681; Nov. 7, 1960, 257,701; Mar. 17, 1961, 262,-566; Aug. 7, 1961, 267,979
13 Claims. (Cl. 172—711)

This invention relates to devices of the kind comprising a frame and a plurality of soil-tilling members, which, during use of the implement are adapted to penetrate into the ground and to be dragged through it so as to break up or otherwise "work" the soil, while they are coupled with the frame with the aid of resilient supporting members, which permit the soil-tilling members to deflect resiliently.

According to the invention there is provided a device of the kind set forth, wherein the supporting members are constructed so that, during use, on the basis of a given deflection of the soil-tilling member, the increase in the force exerted on the soil-tilling member, required for an increase in deflection by one unit length is smaller than half the increase in this force required for an increase in deflection by twice a unit length. Thus a very efficient operation of the soil-tilling member can be ensured, while at the same time, when heavy forces are exerted on the soil-tilling member, this member does not deflect excessively, which member would otherwise come into a position unsuitable for the performance of its function.

The invention furthermore relates to a device of a second kind comprising a frame and soil-tilling members, which, during use of the device, are adapted to penetrate into the ground to a considerable depth below the surface so as to break up or otherwise "work" the soil.

According to a second aspect of the present invention there is provided a device of the second kind set forth, wherein the soil-tilling members are connected with the frame by means of one or more supporting members, which are formed by one or more spring steel, circular rods. The supporting members formed by the circular bars can be manufactured in a simple and cheap manner. It has been found that said supporting members are very suitable for supporting soil-tilling members working the ground to a considerable depth, for example in the case of cultivators, which break up a soil, which is usually hard, so that heavy forces are exerted on the soil-tilling members.

For a better understanding of the invention and to show how it may be carried into effect, reference will now be made, by way of example, to the accompanying drawings, in which:

FIG. 1 is a plan view of a device in accordance with the invention.

FIG. 2 is a side elevation of the device shown in FIG. 1, as seen in the direction of the arrow II in FIG. 1, whereby a ground wheel for supporting the device is omitted.

FIG. 3 shows, on an enlarged scale, a tine for working the ground.

FIG. 4 is an elevation of the tine shown in FIG. 3, as seen in the direction of the arrow IV in FIG. 3.

FIG. 5 shows a second embodiment of a tine for working the ground.

FIG. 6 is an elevation of the tine of FIG. 5, as seen in the direction of the arrow VI in FIG. 5, whereby the frame parts for fastening the tine are omitted.

FIG. 7 shows a third embodiment of a tine for working the ground.

FIG. 8 is a plan view of the tine shown in FIG. 7.

FIG. 9 is a side elevation of the tine shown in FIG. 7.

FIG. 10 shows a fourth embodiment of a tine for working the ground.

FIG. 11 is a plan view of the tine shown in FIG. 10.

FIG. 12 is a side elevation of the tine shown in FIG. 10.

FIG. 18 shows a seventh embodiment of a tine for working the ground.

FIG. 19 is a plan view of the tine shown in FIG. 18.

FIG. 20 is a front view of the tine shown in FIG. 18.

FIG. 21 shows an eighth embodiment of a tine for working the ground.

FIG. 22 is a plan view of the tine shown in FIG. 21.

FIG. 23 shows a plate arranged between the supporting members of the tine shown in FIG. 21.

FIG. 24 shows a ninth embodiment of a tine for working the ground.

FIG. 25 is a plan view of the tine shown in FIG. 24.

FIG. 26 shows a tenth embodiment of a tine for working the ground.

FIG. 27 is a plan view of the tine shown in FIG. 26.

FIG. 28 is a side elevation of the tine shown in FIG. 26.

FIG. 34 is a side elevation of a further tine and a tine connection and

FIG. 35 is a plan view of part of the supporting member and a plate arranged between the supporting members.

FIG. 37 is a side elevation of the tine shown in FIG. 36.

FIG. 38 is an elevation taken on the line X—X of FIG. 37.

Figure 13:
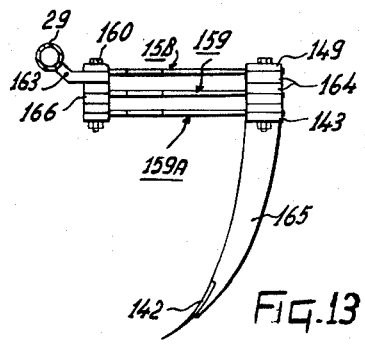
FIG. 13 shows a fifth embodiment of a tine for working the ground.

Referring to the drawings, the frame of the device shown in FIGS. 1 and 2 comprises a frame beam 1, to which two frame beams 2 and 3 are secured. To the ends of the frame beam 1 are fastened bearings 4 and 5, in which rods 6 and 7 are journalled, the ends of which are provided with ground wheels 8 and 9. The rods 6 and 7 are slideable in the bearings 4 and 5 in a vertical direction and can be fixed in a plurality of positions with respect to the frame beam 1 by means of locking pins 10 and 11, which can be taken through holes provided in the bearings 4 and 5 and through holes provided in the rods 6 and 7 (FIG. 2).

On the front side of the device the frame beams 2 and 3 are connected with each other by a beam 13 and on the rear side by a beam 14. To the beam 13 are secured two obliquely ascending beams 15 and 16, the ends of which are bent over in a vertical direction. The top portions 17 and 18 of the beams 15 and 16 are parallel to each other and spaced apart by a small distance and are provided with a plurality of holes 19 and 20 (FIG. 2). To the lower ends 21 of the beams 15 and 16 are secured horizontal pins 22 and 23, which are in line with each other. The frame beams 15 and 16 are furthermore connected with each other by a plate 24, which is located near the lower sides of the portions 17 and 18.

Two struts 25 and 26 are furthermore provided, which are secured at one end to the beams 15 and 16 and at the other end to the frame beam 1.

On the lower side of the frame beams 2 and 3 vertical plates 27 are provided, to which brackets 28 are secured, in which beams 29 provided with arms 30 are rotatably journalled.

In the free ends of the arms 30 provision is made of holes, through which a rod 31 is taken, which is surrounded by springs 32. The springs 32 are enclosed between the arms 30 and rings 33, secured to the rod. Provision is furthermore made of rings 34 on the rod, which are located on the side for the arms 30 remote from the springs 32. To one end of the rod 31 is secured an arm 35, which is coupled pivotably with the aid of a pin 36 with a bracket 38, secured to one end of a rod 37. The free end of the rod 37 is hollow and provided on the inner side with screw thread. Into this tapped end of the rod 37 is screwed a screw spindle 39, provided with a crank 41. On the beam 15 is attached a bearing 40, wherein the spindle 39 is accommodated, so as to be rotatable but not slideable.

One of the arms 30 has a prolongation 42, in which an elongated slot 43 is provided, in which the rod 37 is accommodated, so that the end of the rod 37, coupled with the arm 35, cannot turn about the center line of the rod 31.

To the beam 14 are secured plates 44 and 45, to which are secured, with the aid of bolts 46, brackets 47 and 48, in which a tube 49 is journalled. To this tube 49 are secured two arms 50, which are located on the outer sides of the brackets 47 and 48 so that they limit a movement of the tube 49 in its longitudinal direction.

The ends of the arms 50 are pivoted by means of pins 51 to vertical plates 54 and 55, secured to a frame beam 53. The plates 54 and 55 are coupled with the aid of pins 56 and 57 with arms 58 and 59. The arms 58 and 59 are furthermore pivoted with the aid of pins 60 and 61 to plates 62 and 63, secured to the frame beams 2 and 3. The center line 64 of the tube 49, around which the tube can rotate in the brackets 47 and 48, and the center lines of the aforesaid pins 51, 56, 57, 60, 61 are located at the angular points of a parallelogram.

The tube 49 has furthermore secured to it an arm 65, which is pivoted by means of a pin 66 to a U-shaped bracket 68, secured to the end of a rod 67. The other end of the rod 67 is hollow and provided on the inner side with screw thread, into which can be screwed a screw spindle 69, provided with a crank 70, and journalled in a bearing secured to the beam 16 so as to be rotatable but not slideable.

To each end of the frame beam 53 is secured the vertex of a triangular plate 71 and 72 respectively (FIG. 2). At the other angular points of these plates bearings 74, 75, 76 and 77 are provided with the aid of bolts 73 (FIG. 2). In said bearings shafts 78 and 79 are journalled, on which shafts discs 79A are secured, which serve as soil-crumbling members. The discs 78A arranged on the shaft 78 are arranged partly between the discs 79A arranged on the shaft 79.

To the beams 29 are secured soil-tilling members or tines 80.

FIGS. 3 and 4 show on an enlarged scale a tine 80, preferably made from circular spring steel wire and employed in the device shown in FIGS. 1 and 2. The tine comprises two rod-shaped elements 81 and 82, each of which is fastened with the aid of a curved rod portion 83 and 84 respectively to a rod-shaped coupling member 85 and 86, respectively. The coupling members 85 and 86 form part of supporting members 87 and 88 respectively associated with the tine 80. The supporting member 87 comprises furthermore two parallel rods 89 and 90, which are connected by a curved portion 91, whereas the supporting member 88 comprises two parallel rods 92 and 93, extending in line with the rods 89 and 90, respectively, the said rods being connected by the curved portion 94. The free ends of the rods 90 and 93 are bent over at right angles and have two parallel portions 95 and 96 respectively and 95 and 98 respectively, which are connected by curved portions 97. The portions 96 and 98 are further connected by a portion 99. The portions 96 and 98, together with the curved portion 99, are enclosed between a U-shaped bracket 100 and a plate 101, welded to the beam 29. The limbs 102 of the bracket 100 extend along the sides of the portions 96 and 98 remote from each other. These limbs 102 are provided with recesses for accommodating the plate 101. The recesses provided in the bracket or the plate constitute lug-shaped extensions 102A, which grip around the plate 101 and thus prevent the tine from turning with respect to the beam 29.

The bracket 100 is provided with holes through which are taken the screwthreaded ends 103 of a strap 104, arranged around the beam 29. With the aid of the nuts 105, screwed onto the ends of the strap 104 and with the aid of the bracket 100 the portions 96 and 98 can be clamped tight against the plate 101.

The free ends of two elements 81 and 82 extend parallel to each other. To these ends are secured blades 106, provided with holes through which bolts 107 are taken, which are screwed into tapped holes provided in a clamping plate 108. In order to prevent the tines from slipping from between the blade and the clamping plate, the latter is provided with bent-over edges 109, which extend parallel to the ends of the elements 81 and 82 (FIG. 4).

The discs 78A and 79A, shown in FIGS. 1 and 2, are made from flat sheets provided with substantially trapezoidal extensions 110. The connecting line between two corners 111 and 112 of the extension is tangential to a circle. The shorter side 113 of the extension is located on the outer circumference of the disc. The oblique sides 114 and 115 and the shorter side 113 of the extension are preferably shaped in the form of knife edges.

The soil-tilling device can be coupled by means of the pins 22 and 23 and the holes 19 and 20, with the lifting device of a tractor. In operation the device is moved in the direction of the arrow A. The depth to which the soil is broken up by the tines 80 can be adjusted with the aid of the ground wheels 8 and 9.

The position of the tines 80 can be adjusted by turning the screw spindle 39, which movement involves a displacement of the rod 37 in its longitudinal direction (FIG. 2). When the rod 37 moves in the direction of the arrow B, the rod 31, coupled with the rod 37, is also displaced in the same direction and the arms 30 are caught by the rings 34, secured to the rod 31, so that the beams 29 with the tines secured thereto turn in the direction of the arrow D. Since the springs 32 and the rings 33 move together with the rod 31, the tension of the springs 32 does not change. The bias tension of the springs 32 may be varied by arranging the rings 33 so as to be displaceable along the rod 31 and to be fixable in a plurality of positions with respect to the rod 31.

The height of the discs 78A and 79A of the clod crumbler may be adjusted with the aid of the screw spindle 69. When the screw spindle 69 is rotated, the tube 49 with the arms 50 is also rotated about its longitudinal axis so that the beam 53 with the shafts 78 and 79 may be moved to the desired height. Owing to the parallelogram structure formed by the arms 50, 58 and 59 and the plates 54, 55, 62 and 63, the frame beam 53 and the shafts 78 and 79 move parallel to themselves.

The discs 78A and 79A seated on the shafts 78 and 79 are set into rotation by their contact with the ground and will crumble the soil loosened by the tines 80. Since the discs 78A arranged on the shaft 78 are located partly between the discs 79A arranged on the shaft 79, weed parts will be removed from these discs by means of the discs on the shaft 79.

When the rod 67 is disengaged the clod crumbler bears on the ground at least substantially completely with its own weight, while it is freely movable in a direction of height.

If desired, the ground wheels 8 can be removed from the device. As a matter of course, the assembly may be employed without the clod crumbler.

The embodiment of the tine shown in FIGS. 5 and 6 corresponds mainly to that of the FIGS. 3 and 4. Corresponding parts are designated by the same reference numerals. A difference between the two structures resides in that the rod portions 120 are straight instead of curved. Moreover, the beam 29 is turned through 90° in clockwise direction.

From FIG. 5 it will be seen that the blade 106, which constitutes the lowest point of the tine, viewed in the direction of travel, is located in front of a higher tine part and in front of the fastening means by which the supporting member and the tine are secured to the beam 29. It is thus ensured that material accumulated in front of the tine, for example weeds, can move upwards along the tine and is thus conducted away, so that no accumulation of material will hinder the operation.

FIGS. 7 to 9 show a third embodiment of tines which may also be used in a cultivator. In this embodiment parts similar to those of FIGS. 3 and 4 are denoted by the same reference numerals. The rod shaped elements 121 and 122 of two tines 80 are coupled by means of two parallel torsional rods 123 and 124, two parts 125 and 126 at right angles to these rods and connecting bends 127 and 128, respectively. The tines 121 and 122 are secured to the beam 29 each by means of two arms 129 and 130 respectively, through which the rod-shaped parts are taken.

Apart from a satisfactory operation this structure provides a simple and efficacious support of the tines on the beam 29.

FIGS. 10 to 12 show a further embodiment of a tine. The tine 140 comprises a strip 141, to which a blade 142 is secured at right angles thereto. The strip 141 is secured to a plate 143, which is fastened with the aid of a block 144 to the ends of two rods 145 and 146. The block 144 is furthermore fastened by means of a plate 149 to two further rods 147 and 148. To this end, recesses are provided both in the plates 143 and 149 and in the block 144, so that the rods, the plates and the block can be clamped tight with the aid of bolts 150. The rods 147 and 148 merge into transverse rods 151 and 152, which go over into transverse rods 153 and 154 extending parallel to the rods 151 and 152. The rods 153 and 154 join rods 155 and 156, respectively, lying in line with the rods 147 and 148 and connected by a curved portion 157. The rods 147, 148, 151, 152, 153, 154, 155, 156 constitute a supporting member 158. A similarly shaped supporting member 159 comprises the rods 145 and 146.

The two supporting members 158 and 159 are secured, with the aid of a bolt 160 and clamping plates 161 and 162, to an arm 163, which is secured to the beam 29, to which a number of tines can be fastened in the manner described above. The rods 151, 152, 153 and 154 and the corresponding rods of the supporting member 159 extend transversely to the travelling direction A, so that they are mainly subjected to torsional stress under the action of the forces exerted on the tines. The further parts of the supporting members are mainly subjected to bending stress.

The tine is also capable of deflecting transversely to the direction of travel and the rods extending parallel to the travelling direction, for example, the rods 147 and 148, will then be subjected to torsional stress.

Figure 14:
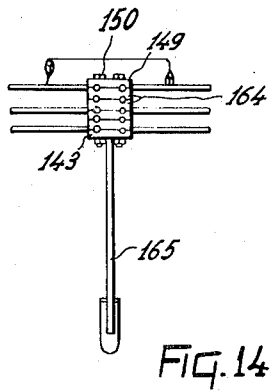
FIG. 14 is a side elevation of the tine shown in FIG. 13.

FIGS. 13 and 14 show an embodiment of a tine which corresponds substantially with that of the FIGS. 10 to 12. Similar parts, are therefore denoted by corresponding reference numerals. The tine comprises a third supporting member 159A, which is shaped in the same form as the supporting members 158 and 159. By means of four blocks 164, the plates 143 and 149 and the bolts 150 the supporting members the plates and the blocks are secured to each other. The strip 165 is shaped in a form differing from that of the strip 141 of FIGS. 10 to 12.

Figure 15:
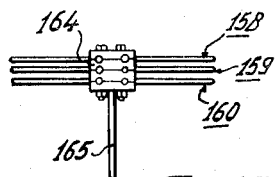
FIG. 15 is part of the side elevation of FIG. 14, the supporting members associated with the tine being spaced apart by a distance differing from that shown in FIG. 14.

The distance between the supporting members can be varied in a simple manner by removing a few of the blocks 164, lying between them, as is illustrated in FIG. 15. In a similar manner the distance between the ends of the supporting members secured to the arms 163 can be varied by removing blocks 166. Thus the value of the force required for the deflection of the tine can be varied.

The arrangement and the operation of the tine corresponds further to that of the tine shown in FIGS. 10 to 12.

Figure 17:
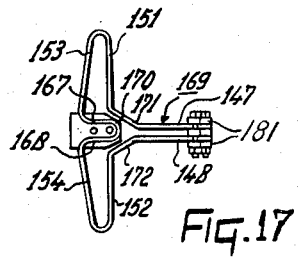
FIG. 17 is a plan view of the tine shown in FIG. 16.
Figure 16:
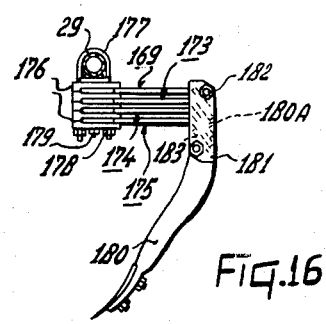
FIG. 16 shows a sixth embodiment of a tine for working the ground.

FIGS. 16 and 17 show a further embodiment of a tine and a supporting member according to the invention, which is substantially similar to that of the FIGS. 10 to 12. Corresponding parts are therefore designated, as far as required, by the same reference numerals. In contrast to the structure shown in FIGS. 10 to 12, the portions 167 and 168 of the supporting member 169 do not extend in opposite direction of the portions 147 and 148, but they extend in the same direction. The portions 167 and 168 are connected by a curved portion 170. The portions 151, 153 and 152, 154 do not extend completely parallel and the portions 151 and 152 are connected with the portions 147 and 148 respectively by an oblique portion 171 and 172, respectively. The tine comprises four supporting members 169, 173, 174 and 175. The are secured to each other and to the beam 29 with the aid of a number of plates 176 and by means of a strap 177 and nuts 178. The plates may, if desired, be provided with grooves, as described for the plates 143 of FIGS. 10 to 12. The whole assembly of plates and supporting members may, as an alternative, be held together by means of a bolt 179 and it can be removed from the beam 29 after the disengagement of the nuts 178. On their other sides the free ends of the supporting members 170, 173, 174 and 175 are bent over downwardly and they are then located on either side of the strip-shaped element 180. The bent-over ends 180A are enclosed between the element 180 and plates 181, which are clamped tight to the ends 180A with the aid of bolts 182, taken through holes provided in the plates 181 and the element 180. The plates 181 are furthermore provided with lugs shaped in the form of supports 183, extending along the ends 180A.

The operation of the tine corresponds with that of FIGS. 10 to 12. The tine has, however, a more compact structure than that of the said figures. With a view to the available space this may be desirable.

FIGS. 18 to 20 show a further embodiment of a tine which also comprises an element 184, extending towards the ground and to the end of which a blade is secured. The element 184 is secured to a plate 185, which is at right angles to the element 184. Between the plate 185 and a block 186 are arranged the ends of supporting members associated with the tine and shaped in the form of plate springs 187 and 188. Between the top side of this block and a plate 189 provision is made of a supporting member 190, which corresponds entirely with the supporting member 158 of FIGS. 10 to 12. The supporting members of the plates and the block are secured to each other by bolts 189A. The other ends of the plate springs 187 and 188 are secured by means of bolts 191 to a bracket 192, which is secured to a beam 29 by means of a bolt 193. The beam 29 has furthermore a support 194, so that the supporting member 190 is clamped tight between this support 194 and the bracket 192 by the same bolt 193 to the beam 29. The plate springs 187 and 188 extend mainly parallel to the direction of travel A, but are at a small angle to each other. They allow a flexible movement about an axis extending transversely to the direction of travel, but they restrict a movement transverse to the direction of travel so that the tines will deflect, as a rule, to a smaller extent transversely to the direction of travel than the tines of the preceding embodiments.

A further embodiment is shown in FIGS. 21 to 23. In this embodiment the tine comprises four supporting members 195, 196, 197 and 198, which are secured, like the supporting members 169, 173, 174 and 175 of the tine shown in FIGS. 15 and 16, to a blade-supporting element 199 and to the beam 29. The plates 200, between which the ends of the supporting members are arranged, are shaped in a particular form, which is shown in a plan view in FIG. 23. Each plate has on the top side and on the bottom side a substantially X-shaped groove 201, in which the ends of each supporting member are arranged side by side. Owing to this X-shaped groove the rod portions located between the plates are prevented from turning about their longitudinal axes or from being disengaged from between the plates. It will be appreciated that similarly shaped grooves may be provided in the plates provided between the supporting members of the tines of the preceding embodiments. Each of the supporting members 195 to 198 has a cylindrical shape, and comprises two portions 202 and 203 respectively, arranged side by side and extending in the direction of travel A and merging into two portions 204 and 205 respectively, extending transversely to the former and going over, in turn, into two portions 206 and 207 respectively, extending obliquely in the direction of travel. The last-mentioned portions merge into two portions 208 and 209 respectively extending substantially in the travelling direction and serving to clamp the supporting members to the beam 29. From the side elevation of FIG. 21 it will be seen that the portions 206 and 207 extend obliquely downwards. In operation these supporting members are also subjected to torsional stress in the various rod portions, as is described above with reference to the tines of FIGS. 10 to 12.

The embodiment shown in FIGS. 24 and 25 exhibits similarity to the embodiment shown in FIGS. 21 to 23. Corresponding parts have been designated by the same reference numerals.

The supporting members of the tine shown are shaped in a slightly different form, so that a more compact structure of the tine is obtained. This is achieved by arranging the transverse portions 204 and 205 underneath the beam 29, whereas the portions 210 and 211, which correspond with the portions 206 and 207 are curved. The transition between the portions 204 and 205 and the portions 202 and 203, extending in the direction of travel A, is formed by oblique portions 212 and 213. Also in this embodiment the portions 210, 211, 212 and 213 are located in a plane extending towards the ground and intersecting the ground behind the beam 29.

FIGS. 26 to 28 show a further embodiment in which a tine comprises a rod 214, of which a curved end 215 is hammered out to form a blade. The tine comprises furthermore two parallel rods 216 and 217, constituting a supporting member and connected by a curved portion 218; the rod 214 being at an angle to the rod 216.

The free end of the rod 217 is bent over twice at right angles, so that the portions 219 and 220 are obtained. The tine is secured to a beam 29A with the aid of a plate 221 and bolts 222 and 223. The plate 221 is curved so that the rods 216 and 217 are adapted to turn about their longitudinal axes. The free end 224 of the portion 220 extends along the side of the beam 29A, so that the tine is held in place.

In operation the device is moved in the direction of travel A. The tine which is very suitable for working lighter kinds of ground, provides an effective operation.

Of particular advantage is the shape of the strips 180 of FIG. 16 and 199 in FIGS. 21 and 24, since these elements are curved outwardly on their front sides, the center of curvature of this part being located after the element, viewed in the direction of travel, so that weeds carried along by the element in operation will slide upwards along the element and will be shaken off by the vibrations performed by the tines in operation.

A further advantage of the strip-shaped elements pointing towards the ground is that not only the element part transverse to the direction of travel but also the element part located in the ground in operation, measured parallel to the direction of travel, are comparatively narrow, at least over a considerable part of the length, so that the member located in the ground can be shaped effectively. The tine portion usually lying above the ground, viewed in the direction of travel, may be wider whereas nevertheless the element can withstand heavy forces.

It will be obvious, that the cultivator and the crumbling device may be employed separately. The clod crumbling device may, to this end, be coupled with an auxiliary frame, which is provided in known manner with means for coupling it with a tractor. The tines described above may be proportioned so that with a given deflection of the soil-tilling member the increase in force exerted on the member required for an increase in deflection by one unit length is smaller than half of the increase in force required for increasing the deflection by twice a unit length. It may be advantageous in this case that for the first part of the deflection of the soil-tilling member the ratio between the deflection and the increase in force is at least substantially linear.

Figure 29:
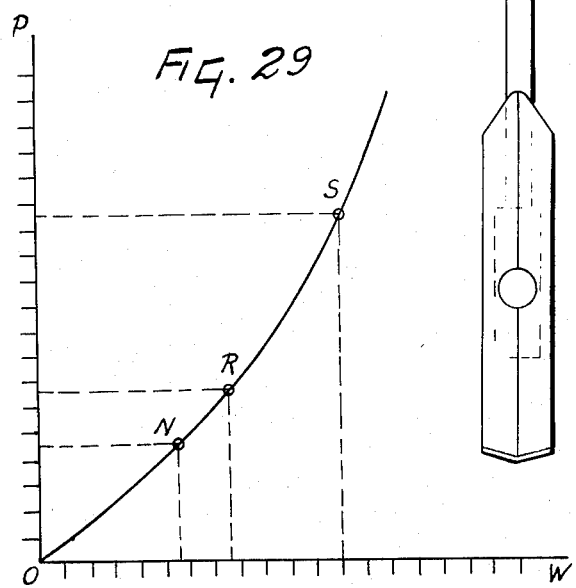
FIG. 29 shows a graph in which the ratio between the force exerted on a tine and the deflection is illustrated.

The resilience characteristic curve of the tine shown in FIGS. 24 and 25 is set forth in FIG. 29. The force P is plotted against the deflection W. The force P exerted on the end of the blade is measured in a direction opposite that of the arrow A and the deflection plotted is the deflection of the end of the blade under the action of the force P.

From the graph it is evident that, from the point O to the point N, the deflection is at least substantially linear. From point N the line has a steeper course. For example at point R of the graph the ratio between the increase in deflection expressed in centimeters and the increase in force for the deflection concerned expressed in kilograms is equal to 0.167, whereas the ratio at point S is 0.13. For the linear part this ratio is 0.25. This ratio is, at least for the larger part of the ascending curve, preferably smaller than 0.18.

It can thus be ensured that the soil-tilling member can effectively deviate over a given distance, after which the deflection decreases rapidly in proportion to the increase in force. The tine then continues moving effectively, while a satisfactory position of the tine for the operation is maintained.

Figure 30:
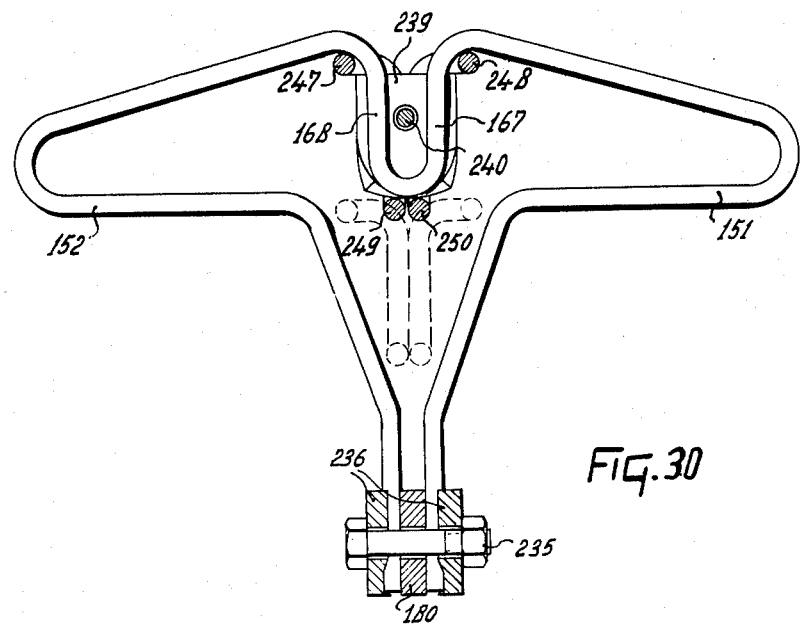
FIG. 30 is a plan view of a supporting member associated with a further embodiment of a tine.

FIGS. 30 to 33 show an embodiment of the tine corresponding substantially with that of FIGS. 16 and 17. Corresponding parts are therefore designated by the same reference numerals. From FIG. 31 it will be seen that the tine comprises four supporting members 231, 232, 233 and 234, having unequal diameters. They are, viewed from above, shaped in the same form, which is shown in FIG. 30. They are arranged, however, in positions alternating over an angle of 180°. The supporting members are coupled by means of two bolts 235 and two clamping pieces 236 with a strip 180, which, like the tine shown in FIG. 17, has on its free end a blade. The fastening of the supporting members to the beam 29 is performed by a plurality of plates 236A which are arranged between the portions 167 and 168 of the supporting members. On the top side of the supporting member 231 and on the bottom side of the supporting member 234 provision is made of plates 238 and 237 respectively. The plates 236A are provided with elevations 239, which prevent the plates from shifting in place with respect to the supporting members. The plates are provided with holes, through which a bolt 240 is taken and is tightened in a tapped hole of the lower plate 237, so that the supporting members and the plates constitute a unit. By means of a bracket 241, a yoke 242 and a clamping bolt 243 this assembly is clamped tight to the beam 29. The beam has to this end on the lower side a strip 244 and on the top side a fastening strip 245. The topmost plate 238 is provided with upright edges 246, which grip around the strip 235.

Figure 33:
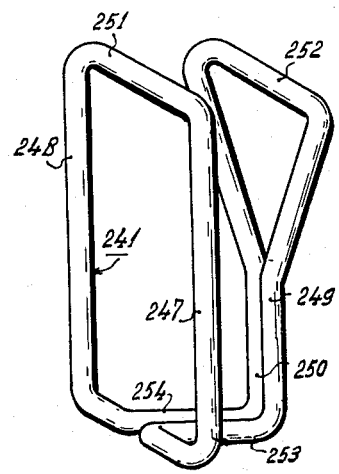
FIG. 33 is a perspective view of a bracket used for fastening the tine.
Figure 32:
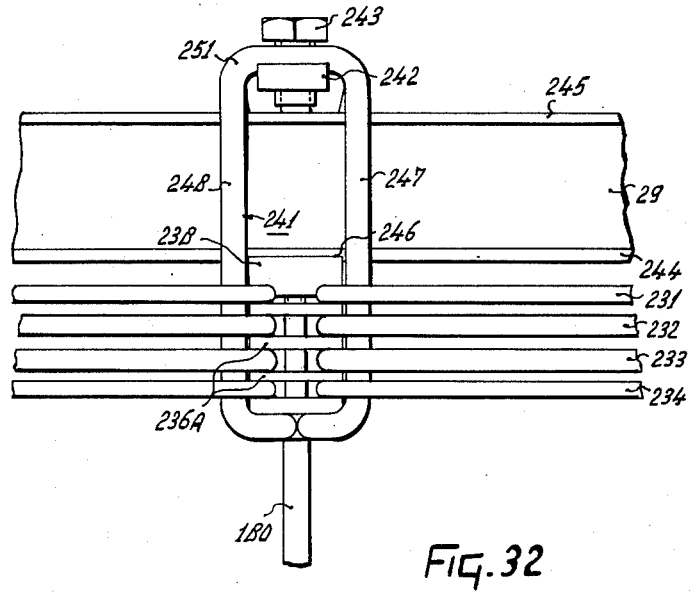
FIG. 32 is partly a front view thereof.
Figure 31:
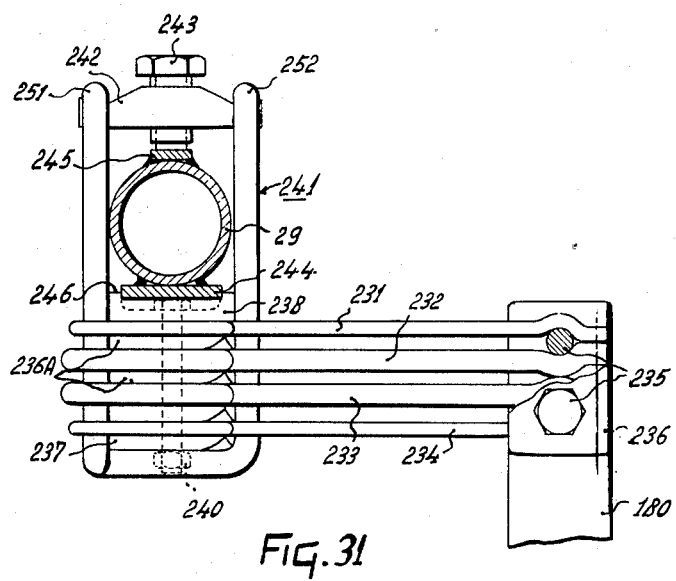
FIG. 31 is partly a side elevation of this tine.

From the figures, particularly from FIG. 33 it will it seen that the bracket 241 has two groups of vertical parts 247, 248 and 249, 250, respectively, which are connected with each other on top by parts 251 and 252 respectively. On the lower side of the parts 247, 249 and 248, 250, respectively are coupled with each other by connecting pieces 253 and 254, respectively, extending mainly transversely to the said parts. The vertical parts 247, 248 are spaced farther apart than the parts 249 and 250, in such a way that the parts 247 and 248 are located at the sides of the plates 236, whereas the parts 249 and 250 practically engage each other. The parts 251 and 252 of the bracket can be displaced along by the yoke 242 and by tightening the clamping bolt 243 the bracket with the supporting member and the plates can be clamped tight to the beam 29. When the clamping bolt 243 is loosened, the bracket 241 with the plates and the supporting member will be lowered. When the bracket has sunk over a distance equal to the height of the upright edges 246 of the top most plate 238, the assembly formed by the supporting members and the plates between which the supporting members are clamped, can be shifted to the front with respect to the beam 29 until the supporting members have been displaced to an extent such that the bracket occupies a position relative to the supporting members as is shown in broken lines in FIG. 30 for the bracket. Then the supporting members can be moved downwards and the supporting members with the tine secured to the said members are then free from the bracket. When the bracket is then lifted, the clamping plate with the bolt can be removed from between the limbs of the bracket, after which also the bracket can be removed from the beam 29. It is thus ensured that a tine with the supporting member can be removed from the beam rapidly as a whole.

FIGS. 34 and 35 show an embodiment which corresponds substantially with that of FIGS. 30 to 33. Corresponding parts are therefore designated by the same reference numerals. The construction of the clamping member by which the supporting members are attached to the beam 29 differs from that of the preceding construction. The said construction will therefore be explained more fully hereinafter. Between the parts 167 and 168 of the supporting members 265, 266, 267 and 268 lying one above the other and shaped in the same form as those shown in FIGS. 30 to 33, but having equal diameters of the rods, provision is made of piece-plates 253. The lowermost supporting member bears on a plate 254, to which two bolts 255 and 256 are secured. The bolt 255 is located between the parts 167 and 168, whereas the bolt 256 is in contact with the curved portions 170. On two opposite sides of the rectangular plate 253 semi-circular recesses are provided, in which the bolts 255 and 256 are accommodated, so that the plates 253 are secured against displacement with respect to the bolts. On the topmost supporting members lies a plate 257, which is provided on the top with upright edges 258 and on the bottom side with a shoulder 259, by means of which it is arranged between the parts 167 and 168 of the topmost supporting member 265. In the plate 257 provision is made of a recess, in which a head 260 of a bolt 261 is arranged. The bolt 261 is taken through holes in the plates 253 and 254 and onto the end of the bolt projecting underneath the plate 254 is screwed a nut 262, so that the supporting members are clamped tight between the plates and the supporting members, the plates and the tine form an assembly. With the aid of the bolts 255 and 256 this assembly is clamped tight to the beam 29, which is shown in FIG. 34. To this end the beam 29 is provided with a strip 244, which extends in the longitudinal direction of the beam. The edges 258 of the plate 257 are located each on opposite sides of this strip, so that the plate 257 is secured against displacement relative to the beam 29. The bolts 255 and 256 are taken through holes provided in a bracket 263, which bears on the side of the beam 29 remote from the strip 244. With the aid of nuts 264 screwed onto the bolt ends taken through holes of the bracket 263 the plates with the intermediate supporting members are clamped tight to the beam 29.

Figure 36:
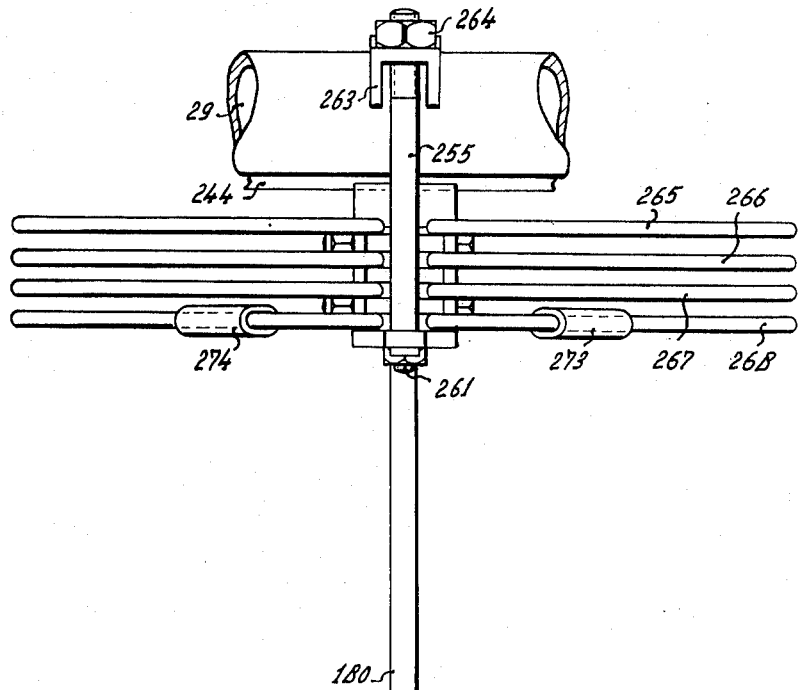
FIG. 36 is a front view of a tine, wherein a supporting member is provided with brackets, which support the torsional rods.

The tine shown in FIGS. 36 to 38 corresponds mainly with that of FIGS. 30 to 35 and similar parts are designated by the same reference numerals. In this embodiment the torsional rods 269 and 270, 271 and 272 of the lowermost supporting member 268 are provided each with a bracket 273 and 274, respectively, which are disposed in the closest possible proximity of the axis of symmetry 275 of the supporting member. The brackets prevent the lowermost supporting member, which is heavily stressed in operation, from being overloaded, while the disposition of the torsional rods relative to each other remains advantageous for a satisfactory operation. If desired, also the further supporting members, apart from the lowermost supporting member, may be provided with the brackets described above.

What we claim is:

1. A soil-working device comprising a supporting member for soil penetrating means including a pair of rod-shaped elements for connection to the soil penetrating means, a pair of resilient torsion portions extending in substantially opposite directions at right angles from said supporting elements, and a pair of securing portions generally parallel to the supporting elements extending from the free ends of said torsion portions for securing the supporting members to said device, said torsion portions lying substantially in a plane which is transverse to the expected force from the soil acting on said penetrating means when working the soil.

2. The invention of claim 1 wherein the device includes a frame having resilient means for urging said supporting means and soil penetrating means forwardly in the intended direction of travel.

3. The invention of claim 1 wherein the rod-shaped elements, torsion portions and securing portions are formed of circular rod parts.

4. The invention of claim 3 wherein the rod-shaped elements, torsion portions and securing portions are formed of a single curved rod.

5. The invention of claim 1 wherein the torsion portions include U-shaped portions and brackets which are positioned around the legs of said portions to resist their motion apart.

6. The invention of claim 1 wherein the torsional portions extend substantially perpendicular to a vertical plane lying in said device's intended direction of travel.

7. The invention of claim 1 wherein said supporting member encloses a cross-shaped area.

8. The invention of claim 1 wherein a pair of plate springs connect said soil penetrating means to said device.

9. The invention of claim 1 wherein said supporting member includes a first part comprising a torque spring operationally subjected to torsional stress and a further resilient part operationally subjected to bending stress.

10. The invention of claim 1 wherein the ratio of deflection of the free end of said soil-penetrating means in centimeters to the increase in force in kilograms required for said deflection is less than 0.18.

11. The invention of claim 1 wherein the supporting member is comprised of two symmetrically-shaped parts formed of a single circular rod.

12. The invention of claim 1 wherein the device includes means for adjustably positioning the soil-penetrating means relative to said device.

13. The invention of claim 1 wherein the device includes a frame and the securing portions are clamped to the frame.

References Cited by the Examiner

UNITED STATES PATENTS

| | | | |
|---|---|---|---|
| 234,321 | 11/80 | Nellis | 172—708 |
| 235,578 | 12/80 | Moore et al. | 172—707 |
| 241,402 | 5/81 | Nellis | 172—707 |
| 847,685 | 3/07 | Pavert. | |
| 1,112,045 | 9/14 | Young | 172—707 |

ANTONIO F. GUIDA, *Primary Examiner.*

ARNOLD RUEGG, *Examiner.*